(12) United States Patent
Wohlgemuth et al.

(10) Patent No.: US 10,711,326 B2
(45) Date of Patent: Jul. 14, 2020

(54) METHOD FOR THE HYDROMETALLURGICAL RECOVERY OF LITHIUM FROM THE LITHIUM MANGANESE OXIDE-CONTAINING FRACTION OF USED GALVANIC CELLS

(71) Applicant: Rockwood Lithium GmbH, Frankfurt am Main (DE)

(72) Inventors: David Wohlgemuth, Frankfurt (DE); Mark Andre Schneider, Friedrichsdorf-Burgholzhausen (DE); Rebecca Spielau, Eppstein (DE); Johannes Willems, Frankfurt (DE); Martin Steinbild, Frankfurt (DE); Norbert Kliehm, Altenstadt (DE)

(73) Assignee: Albemarle Germany GmbH, Frankfurt am Main (DE)

( * ) Notice: Subject to any disclaimer, the term of this patent is extended or adjusted under 35 U.S.C. 154(b) by 479 days.

(21) Appl. No.: 14/433,103

(22) PCT Filed: Oct. 9, 2013

(86) PCT No.: PCT/EP2013/003029
§ 371 (c)(1),
(2) Date: Apr. 9, 2015

(87) PCT Pub. No.: WO2014/056610
PCT Pub. Date: Apr. 17, 2014

(65) Prior Publication Data
US 2015/0267278 A1 Sep. 24, 2015

(30) Foreign Application Priority Data
Oct. 10, 2012 (DE) ......................... 10 2012 218 468

(51) Int. Cl.
*C22B 26/12* (2006.01)
*C22B 7/00* (2006.01)
(Continued)

(52) U.S. Cl.
CPC .............. *C22B 26/12* (2013.01); *C01B 25/45* (2013.01); *C01D 15/02* (2013.01); *C22B 7/007* (2013.01);
(Continued)

(58) Field of Classification Search
None
See application file for complete search history.

(56) References Cited

U.S. PATENT DOCUMENTS 4,434,241 A * 2/1984 Larkins, Jr. .............. B01J 31/26
423/179.5
6,120,927 A 9/2000 Hayashi et al.
(Continued)

FOREIGN PATENT DOCUMENTS

CN 102163760 A 8/2011
CN 102208706 A 10/2011
(Continued)

OTHER PUBLICATIONS

Sun, et al. "Organic oxalate as leachant and precipitant for the recovery of valuable metals from spent lithium-ion batteries", Waste Management, 32 (2012), pp. 1575-1582.

*Primary Examiner* — Melissa S Swain
(74) *Attorney, Agent, or Firm* — Marcy M. Hoefling; Troy S. Kleckley; Nathan C. Dunn

(57) ABSTRACT

The invention relates to a method for the hydrometallurgical recovery of lithium from the lithium manganese oxide-containing fraction of used galvanic cells.

17 Claims, 1 Drawing Sheet

| Experiment number | S/L [g/l] | Mole ratio LMO : Oxalic acid | Oxalic acid form of addition | Addition period | Reaction time (incl. addition) | Li [wt.%] | Mn [wt.%] |
|---|---|---|---|---|---|---|---|
| 1 | 45 | 1 : 4 | dissolved | 3360 s | 6240 s | 100 | 5.6 |
| 2 | 59 | 1 : 4 | dissolved | 3240 s | 6720 s | 82 | 4.1 |
| 3 | 167 | 1 : 4 | solid | 2220 s | 8 h | 79 | 1.9 |
| 4 | 45 | 1 : 4.5 | dissolved | 2400 s | 56 h | 96 | 0.7 |
| 5 | 167 | 1 : 4.5 | solid | 2400 s | 8 h | 86 | 0.5 |
| 6 | 167 | 1 : 4.5 | solid | 1860 s | 5 h | 77 | 0.8 |

Table 1

(51) Int. Cl.
    *C01B 25/45*      (2006.01)
    *C01D 15/02*      (2006.01)
    *H01M 10/54*      (2006.01)
(52) U.S. Cl.
    CPC ........... *H01M 10/54* (2013.01); *Y02P 10/234*
                     (2015.11); *Y02W 30/84* (2015.05)

(56)          References Cited

U.S. PATENT DOCUMENTS 7,078,122  B1    7/2006   Rosenberg
    7,820,317  B2   10/2010   Tedjar et al.
    2003/0180604 A1* 9/2003   Zenger .................... C22B 26/12
                                                              429/49
    2008/0050295 A1  2/2008   Uchida et al.
    2011/0059339 A1  3/2011   Yamasaki et al.

FOREIGN PATENT DOCUMENTS

EP         1733451    A1      12/2006
    EP         1 760 821  A1       3/2007
    EP         1760821    A1  *    3/2007   ............ C22B 3/165
    FR         2 796 207  A1       1/2001
    JP         51125606   A       11/1976
    JP         1154159    A        2/1999
    JP         11265737   A   *    9/1999   ............ H01M 10/54
    JP         2002198103 A        7/2002
    JP         2009289553 A       12/2009
    JP         2011094227 A        5/2011
    KR         2012 0031831 A      4/2012
    KR         20120031831 A       4/2012
    KR         1020100093451   *   4/2012   ............ C22B 26/12
    RU         2016140    C1       7/1994
    WO         2005101564 A1      10/2005
    WO         2012/072619 A1      6/2012

* cited by examiner

| Experiment number | S/L [g/l] | Mole ratio LMO : Oxalic acid | Oxalic acid form of addition | Addition period | Reaction time (incl. addition) | Li [wt.%] | Mn [wt.%] |
|---|---|---|---|---|---|---|---|
| 1 | 45 | 1 : 4 | dissolved | 3360 s | 6240 s | 100 | 5.6 |
| 2 | 59 | 1 : 4 | dissolved | 3240 s | 6720 s | 82 | 4.1 |
| 3 | 167 | 1 : 4 | solid | 2220 s | 8 h | 79 | 1.9 |
| 4 | 45 | 1 : 4.5 | dissolved | 2400 s | 56 h | 96 | 0.7 |
| 5 | 167 | 1 : 4.5 | solid | 2400 s | 8 h | 86 | 0.5 |
| 6 | 167 | 1 : 4.5 | solid | 1860 s | 5 h | 77 | 0.8 |

Table 1

METHOD FOR THE HYDROMETALLURGICAL RECOVERY OF LITHIUM FROM THE LITHIUM MANGANESE OXIDE-CONTAINING FRACTION OF USED GALVANIC CELLS

FIELD

This application is a § 371 of International Application No. PCT/EP2013/003029 filed Oct. 9, 2013, and claims priority from German Patent Application No. 10 2012 218 468.6 filed Oct. 10, 2012, each of which is incorporated by reference herein in its entirety for all purposes.

BACKGROUND

The subject matter of the invention is a method for the hydrometallurgical recovery of lithium from the fraction of used galvanic cells containing lithium manganese oxide.

Mobile electronic devices require increasingly powerful rechargeable batteries for self-sufficient power supply. For these purposes, lithium-ion batteries are used on account of the energy density thereof expressed in Wh/kg, cycling stability and low self-discharge. Lithium-ion batteries with transition metal oxides as active cathode material are very widespread. The active cathode material in these batteries consists of lithium transition metal oxides, from which lithium ions are released during charging and intercalated in the anode material. Of particular importance are the lithium manganese mixed oxides, which are also known in abbreviated form as manganese spinel cells or batteries. Large-format lithium rechargeable batteries are used for stationary applications (power back-up) or in the automobile field for traction purposes (hybrid drive or pure electric drive). With respect to safety in the latter applications, lithium manganese oxide batteries are recognized as being of outstanding importance. Since the amount of recyclable material contained therein grows with the size and number of the manufactured, charged and reused batteries, an economical method for recovery of the lithium within the batteries is necessary.

A method for recovery of lithium from the LiFePO$_4$-containing fraction of shredded and sifted cells is known from the document WO 2012/072619 A1, in which the fraction containing LiFePO$_4$ is treated with acid solution in the presence of an oxidizing agent. The dissolved-out lithium ions are separated from the undissolved iron phosphate and precipitate out as salts from the solution containing lithium. The hydrometallurgical reclamation takes place with dilute sulphuric acid accompanied by introduction of oxygen, ozone or addition of hydrogen peroxide in the temperature range of 80° C. to 120° C.

Disadvantages of this method are the high energy intensity of the extraction process, the high requirements with respect to corrosion resistance of the apparatus used and the purity of the lithium salts obtained by precipitation.

BRIEF DESCRIPTION OF DRAWINGS

FIG. 1 illustrates a table showing certain conditions and results for experiments described herein.

DETAILED DESCRIPTION

The object of the invention is to provide a method, which ensures the highest possible energy efficiency in the extraction of lithium together with low requirements with respect to the corrosion resistance of the apparatus used and increased purity of the lithium compounds obtained.

The stated object is achieved by a method for hydrometallurgical recovery of lithium from the fraction of used galvanic cells containing lithium manganese oxide, in which a fraction containing lithium manganese oxide with a particle size up to 500 μm is added to oxalic acid in a hyper-stoichiometric amount relative to the manganese content in the lithium manganese oxide and is solubilized at a solid/liquid ratio in the range of 10 to 250 g/l at temperatures of 30 to 70° C., the lithium-containing solution formed is separated and the remaining residue is washed at least twice, the separated lithium and the washing solution containing lithium are combined, dissolved residual manganese content is reduced by precipitation as hydroxide, separated and washed and the remaining lithium-containing solution is further purified by conversion into the carbonate, chloride or sulfate and, if necessary, by subsequent crystallization. Surprisingly, it was found that the extraction of lithium without an additional heat source takes place readily through utilization of the reaction heat generated during the extraction. A virtually autocatalytic decomposition of the reducing agent can be generally avoided, as the heat of reaction is controlled and kept very low by the dosing of the reducing agent. Effectively, only stoichiometric amounts of reducing agent must be used in order to extract the lithium.

Depending on the chosen reaction conditions, the manganese precipitates during the extraction process predominantly in the form of undissolved manganese oxalate.

In doing so, the contained lithium is solubilized to more than 95 wt. % under the specified mild, hydrometallurgical solubilization conditions and recovered at more than 90 wt. %.

Preferably the content of multivalent metal cations is reduced further by means of ion exchange. The lowered content of multivalent metal cations has a particularly positive effect on further processing of the solution by means of electrodialysis with bipolar membranes, since these metal cations act as "membrane poisons" due to deposition thereof in the form of hydroxides in and on the membranes used.

More preferably the fraction containing lithium manganese oxide has a particle size up to 500 μm, preferably 100 to 400 μm. The use of the stated particle size improves the dissociation behavior.

Advantageously the oxalic acid is used at a concentration of 0.2 to 1.2 mol/l, preferably 0.5 to 1.0 mol/l or directly as a solid. The use of solid oxalic acid considerably reduces the reaction volume.

More preferably the solid to liquid ratio is adjusted in a range of 20 to 200 g/l, preferably 45 to 90 g/l. In spite of the high solid content in the reaction mixture, the contained lithium is solubilized nearly quantitatively.

Preferably the digestion is carried out at temperatures of 35 to 65° C., preferably at 40 to 60° C. Surprisingly, as a result, the effectiveness of the dissolution of the lithium is not substantially influenced either by the duration or the amount. The stated temperature range is adjustable with ordinary technical equipment.

Advantageously the digestion residue is washed at least three times. It was found, that more than 90 wt. % of the contained lithium can be obtained by this means.

Preferably the oxalic acid is used in excess to avoid a simultaneous precipitation of manganese oxalate and lithium in the form of the carbonate. More preferably a 0.1 to 1 molar excess is used, preferably 0.2 to 0.8 molar excess.

The product made according to the method is suitable with respect to the purity thereof for the production of lithium transition metal oxides or lithium transition metal phosphates and may preferably be used to make active materials for use in cathodes of lithium-ion batteries.

The method according to the invention is described in general terms hereinafter.

EXAMPLES

The invention is explained by means of the following examples and Table 1.

Under the conditions specified in Table 1, 6 experiments were carried out with a fraction containing lithium manganese oxide.

The invention claimed is:

1. A method for hydrometallurgical recovery of lithium from a fraction of used galvanic cells containing lithium manganese oxide, the method comprising the steps of:
   adding the fraction of used galvanic cells containing lithium manganese oxide with a particle size up to 500 μm to a hyper-stoichiometric amount of oxalic acid based on the manganese content in the lithium manganese oxide, wherein a 0.1 to 1.0 molar excess of oxalic acid is used, and is solubilized in a solid/liquid ratio in the range of 10 g/l to 250 g/l at a temperature in the range of 30° C. to 70° C. to form a lithium-containing solution;
   separating the lithium-containing solution from a remaining residue; and
   washing the remaining residue at least twice to form a washing solution containing lithium;
   wherein the separated lithium-containing solution and the washing solution containing lithium are combined, a dissolved manganese residue content is reduced by precipitation as hydroxide, separated and washed, and a remaining lithium-containing solution is further purified by conversion into a carbonate, chloride or sulfate.

2. The method according to claim 1, wherein a content of multivalent metal cations is reduced using an ion exchanger.

3. The method according to claim 1, wherein the fraction of used galvanic cells containing lithium manganese oxide has a particle size of 100 μm to 400 μm.

4. The method according to claim 2, wherein the fraction of used galvanic cells containing lithium manganese oxide has a particle size of 100 μm to 400 μm.

5. The method according to claim 1, wherein the oxalic acid is used at a concentration of 0.2 mol/l to 1.2 mol/l.

6. The method according to claim 2, wherein the oxalic acid is used at a concentration of 0.2 mol/l to 1.2 mol/l.

7. The method according to claim 1, wherein the oxalic acid is used at a concentration of 0.5 mol/l to 1.0 mol/l.

8. The method according to claim 1, wherein the solid to liquid ratio is adjusted in the range of 20 g/l to 200 g/l.

9. The method according to claim 1, wherein in the solubilization step, the temperature is in the range of 35° C. to 65° C.

10. The method according to claim 1, wherein in the washing step, the remaining residue is washed at least three times.

11. The method according to claim 1, wherein the oxalic acid is used in a molar excess of from 0.2 to 0.8.

12. The method according to claim 1 further comprising the step of crystalizing the carbonate, chloride, or sulfate.

13. The method according to claim 1, wherein in the solubilization step the temperature is in the range of 40° C. to 60° C.

14. The method according to claim 1, wherein the solid to liquid ratio is adjusted in the range of 45 g/l to 90 g/l.

15. A method comprising the steps of:
   (A) contacting a fraction of used galvanic cells containing lithium manganese oxide with oxalic acid, wherein the fraction containing lithium manganese oxide has a particle size up to 500 μm and a mole ratio of lithium manganese oxide to oxalic acid is in the range of from 1:4 to 1:4.5;
   (B) solubilizing the lithium contained in the fraction containing lithium manganese oxide at a solid/liquid ratio in the range of 10 g/l to 250 g/l at a temperature in the range of 30° C. to 70° C. to form a lithium-containing solution;
   (C) separating the lithium-containing solution from a remaining residue;
   (D) washing the remaining residue at least twice to form a washing solution containing lithium;
   (E) combining the lithium-containing solution from step (C) and the washing solution containing lithium from step (D) to form a combined solution containing lithium;
   (F) reducing a dissolved manganese residue content in the combined solution containing lithium by precipitation of manganese hydroxide;
   (G) separating the precipitated manganese hydroxide from the combined solution containing lithium to form a remaining lithium-containing solution; and
   (H) purifying the remaining lithium-containing solution by conversion into lithium carbonate, lithium chloride or lithium sulfate;
   wherein heat is supplied by reaction heat in step (B), without an additional heat source, and the temperature is controlled by regulating the mole ratio of lithium manganese oxide to oxalic acid.

16. The method of claim 1, wherein in the solubilizing step heat is supplied by reaction heat, without an additional heat source, and the temperature is controlled regulating a mole ratio of lithium manganese oxide to oxalic acid.

17. The method of claim 15 further comprising washing the precipitated manganese hydroxide.

* * * * *

UNITED STATES PATENT AND TRADEMARK OFFICE
CERTIFICATE OF CORRECTION

PATENT NO. : 10,711,326 B2  
APPLICATION NO. : 14/433103  
DATED : July 14, 2020  
INVENTOR(S) : Wohlgemuth et al.

Page 1 of 1

It is certified that error appears in the above-identified patent and that said Letters Patent is hereby corrected as shown below:

On the Title Page

On page 2, item (56), under the heading "FOREIGN PATENT DOCUMENTS", the following reference and date should be listed:
KR 1020110117024 A   2011-10-26

In the Specification

Column 1, Line 7, reads:
"FIELD" and should be deleted

Column 1, Line 15, reads:
"BACKGROUND"
And should read:
-- FIELD --

After Column 1, Line 19, and before Column 1, Line 20, the following heading should be inserted:
-- BACKGROUND --

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*